United States Patent Office 3,508,263
Patented Apr. 21, 1970

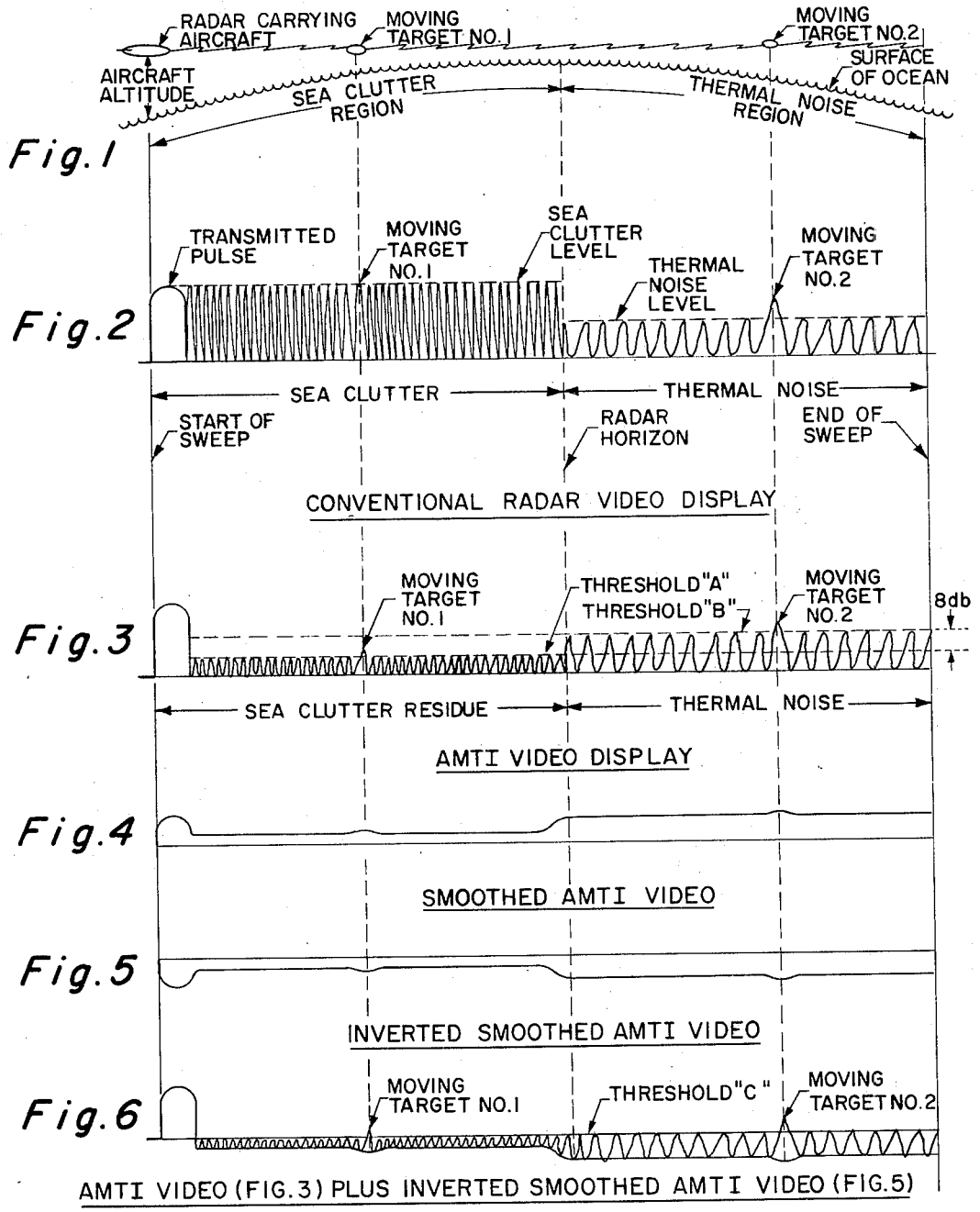
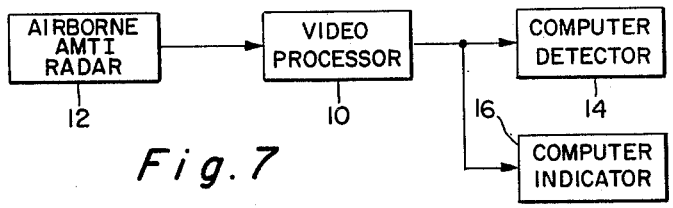

---

3,508,263
APPARATUS FOR ENHANCING THE TARGET DETECTION CAPABILITIES OF COMPRESSED-PULSE AMTI RADARS
Lowell V. Thompson, Ventura, Calif., assignor to the United States of America as represented by the Secretary of the Navy
Filed July 28, 1966, Ser. No. 569,561
Int. Cl. G01s 7/32
U.S. Cl. 343—17.2       2 Claims

ABSTRACT OF THE DISCLOSURE

Apparatus for enhancing the target-detection capabilities of an airborne radar under conditions where a considerable amount of sea clutter is present. The invention system acts to delay the video to be regulated by precisely the time period required to measure the signal and "smooth" a regulating voltage, thus achieving a time-coincident regulation. A portion of the video signal is passed through a filter which removes the high-frequency components, and the output of this filter is inverted in phase and added to the remaining portion of the video signal after the latter is time-delayed, thus providing uniform signal peaks to a threshold network.

---

The invention described herein may be manufactured and used by or for the Government of the United States of America for governmental purposes without the payment of any royalties thereon or therefor.

The present invention relates to radars, and more particularly to auxiliary equipment for improving the target detection capabilities of an airborne radar of the MTI type.

Systems of the type with which the present invention is designed to be used are known as MTI (moving target indicator) radars, and are concerned with the detection and/or display of targets having a radial velocity component. Ideally, they eliminate from the display other objects which are fixed in position with respect to the source of transmitted energy. In the latter category fall such items as hills, trees, houses, etc. (commonly grouped under the general designation of "ground clutter") and reflections from the surface of a body of water (commonly known as "sea clutter"). Energy returned from such objects may be of an amplitude sufficient to mask or obscure reflections from a desired target, and consequently render the latter more difficult of detection.

Radars of the above type are particularly useful for long-range surveillance and automatic target detection in an airborne-early-warning system. The operational requirements of such a system necessitate the detection of small aircraft targets against a clutter background, the latter usually being produced by reflections from the surface of the ocean. In order to eliminate to the maximum possible extent the effect of this reduction in the radar's target detection capabilities, the latter is designed so as to employ short effective pulse lengths to reduce the sea clutter area against which the target signal must compete, and then employ the Doppler frequency shift of the signal from the moving target in order to separate its return from the sea clutter.

To obtain short effective pulse lengths, many radars of the type above described make use of a pulse expansion and compression technique in order to expand a short pulse for transmission, and then to compress the received signal to its original form. In order to achieve the desired results, this pulse expansion and compression circuitry must include means for limiting the amplitude of the received signals before compression. Following such pulse compression, the signals are passed through a clutter-coherent canceller, which, by discriminating between Doppler frequency shifts, reduces the sea clutter without significantly reducing either signals from moving targets or the thermal noise power. To provide automatic target detection, the radar signals are processed by a computer detector, this process establishing a threshold level so that any signals below this level are discarded. Signals above the threshold level are stored on a magnetic drum, and then compared with subsequent signals at the same range over several radar sweeps in order to determine whether targets are present.

However, a problem peculiar to the above combination of functions is encountered when attempting to establish a satisfactory threshold level. All of the signals from clutter, moving targets and thermal noise are limited to the same level in the pulse compression circuit. Compression then improves sea clutter signals relative to the thermal noise power, following which the coherent canceller reduces the sea clutter signals in amplitude. This leaves the sea clutter residue below the amplitude of the thermal noise. However, since the sea clutter extends only to the radar horizon, each radar sweep presents clutter residue to the horizon and thermal noise for the remainder of the sweep. If the threshold is optimized for clutter residue, moving targets which are within the sea clutter range can be seen by the radar operator, but many "false alarms" occur in the noise region. Conversely, if the threshold is optimized for the noise region, small targets in the sea clutter are lost. Consequently, operation of the radar system is not completely satisfactory in that detection of targets in the clutter region is somewhat uncertain.

A number of attempts have been made to incorporate video regulators and threshold control devices in the radar system. A majority of these expedients have made use of a measure of the radar video signal, and then attempted to correct such video or the threshold level in accordance with this measurement. However, measuring apparatus which included smoothing networks introduced time delays which could not be tolerated and adversely affected system operation.

In accordance with a feature of the present concept, the above problem is solved by providing means for delaying the video to be regulated by exactly the time required to measure the signal and "smooth" a regulating voltage. This enables a time-coincident regulation to be achieved which produces no adverse effects in the radar output. In a preferred embodiment, the 5-megacycle radar video is passed through a 64-kc. low-pass filter, which, by eliminating the high-frequency components, reduces the waveform essentially to its own envelope. The time delay incurred is approximately 5 microseconds. The 5-megacycle radar video is also delayed 5-microseconds in a wide-band delay line and added to the inverted envelope. By this process, the peaks of the thermal noise power can be made to match the level of the peaks of the clutter residue. This provides uniform signal peaks to the input of the threshold device, and hence the desired regulation is achieved.

One object of the present invention, therefore, is to provide means for improving the moving target detection capabilities of an airborne moving target indicator radar system employing pulse expansion and compression techniques.

A further object of the present invention is to provide means for improving the automatic detection capabiliites of an MTI radar in the presence of relatively high-amplitude sea clutter.

An additional object of the invention is to provide, in a radar system of the pulse expansion and compression type designed for the automatic detection of moving targets, means whereby the peaks of the thermal noise power can be made to match the peaks of the cutter residue, thus providing uniform signal peaks at the input of the radar threshold device.

Other objects, advantages, and novel features of the invention will become apparent from the following detailed description of the invention when considered in conjunction with the accompanying drawings, wherein;

FIG. 1 is a diagram of one environment in which an AMTI radar may operate;

FIG. 2 is a diagram illustrating the A scope display produced by a conventional radar of the moving-target-indicator type, showing the manner in which moving target may be obsured by "sea clutter" under certain conditions;

FIG. 3 is a diagram indicating the manner in which the coherent canceller reduces the "sea clutter" signal so as to leave the sea clutter residue below the thermal noise level, the threshold level being optimized either for "clutter" residue or for normal thermal noise;

FIG. 4 is a diagram indicating the manner in which the radar video is reduced in waveform essentially to its own envelope by eliminating therefrom the high-frequency components;

FIG. 5 is a diagram indicating how the waveform of FIG. 4 is inverted;

FIG. 6 is a diagram indicating how the video signal of FIG. 3 may be added to the inverted envelope of FIG. 5 so that the peaks of the thermal noise power are made to match the peaks of the clutter residues;

FIG. 7 is a block diagram indicating how the video processor of the present invention may be utilized in conjunction with an AMTI radar of the pulse compression and expansion type which makes use of some suitable form of detecting or indicating apparatus.

Figure 8:
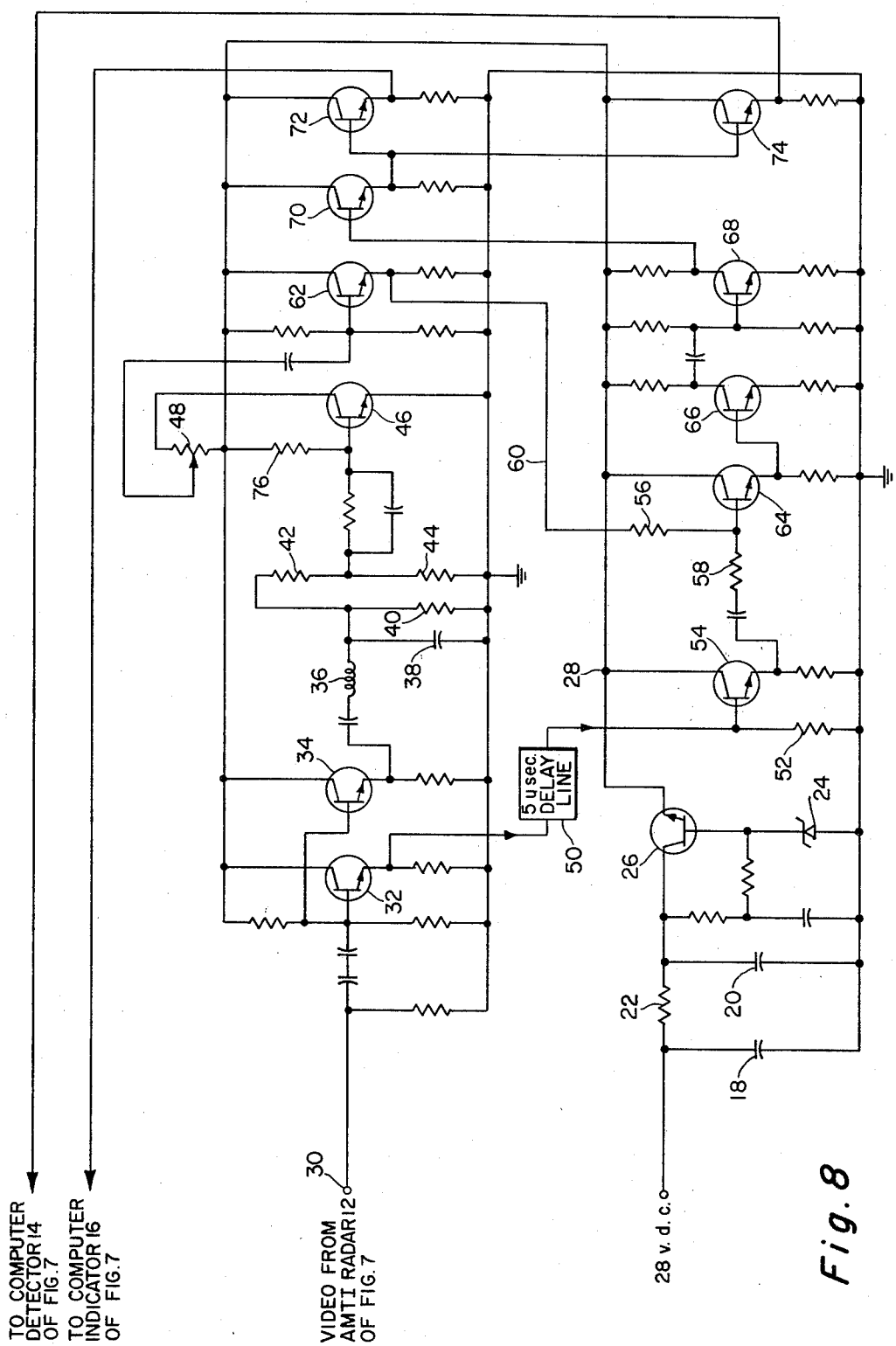
FIG. 8 is a schematic diagram of one form of video processor designed in accordance with the principles of the present invention.

The present concept is directed to auxiliary equipment designed for use with an airborne moving target indicator (such for example as that known as the AN/APS–96 Radar) which incorporates the functions of amplitude limiting, pulse compression, pulse expansion and clutter coherent cancellation in order to detect small aircraft targets against a clutter background of sea return. Although the present concept is in no way concerned with the operational details of the radar equipment per se, nevertheless it is believed that a brief summary of the operation of a radar of this type will be helpful in understanding the manner in which the present invention improves the overall results obtained thereby.

It has been found that short effective pulse lengths reduce the clutter area against which the target signal must complete, and, in addition, the signal returned from a moving target may be separated from the clutter background by detecting and utilizing the Doppler shift of this return target signal.

In order to obtain short effective pulse lengths, a radar of the type with which the present invention is designed to utilize may employ a pulse expansion and compression circuit to expand a generated pulse (having a length, for example, of .2 microsecond) to a longer frequency-chirped pulse for transmission. This longer pulse may have a time duration, for example, of 12.8 microseconds. When the return signals from the target are received, the 12.8 microsecond (for example) pulse is compressed back to its original length. However, in order to obtain satisfactory results, it has been found necessary to amplitude-limit the received signals before they are so compressed.

Following pulse compression, the above described technique employs a clutter-coherent canceller, which, by discriminating between Doppler frequency shifts, reduces the sea clutter return without significantly reducing either the signals from moving targets or the thermal noise power.

The output of the above-mentioned coherent-canceller is applied to a computer-detector to provide automatic target detection. The process employed establishes a threshold level, and signals below this threshold level are stored on a magnetic drum and compared with subsequent signals at the same range over several radar sweeps in order to determine whether targets are present. Automatic target detection is thus accomplished.

It has been found, however, that under certain conditions the moving target indication or signal is so obscured by the sea cluster as to render detection of the former uncertain. This is due primarily to the difficulty in establishing satisfactory indicator or computer video threshold levels. The problem will be recognized when it is recalled that all of the signals from sea clutter, moving targets and thermal noise are limited to the same level in the pulse compression circuit. The latter then acts to increase the target and sea clutter signals relative to the thermal noise power, this increase being, for example, in the order of 5 db. FIG. 3 illustrates the manner in which the coherent cancellor then reduces the sea clutter signals by some finite amount such, for example, as 13 db. In this example, the sea clutter residue will then be at a level 8 db below the thermal noise. It will be noted that target signals are also increased by this pulse compression, but returns from small targets in the clutter region may be well below the thermal noise.

Inasmuch as the sea clutter extends only to the radar horizon (see FIG. 1) each radar sweep presents clutter residue to the horizon and the thermal noise for the remainder of the sweep. Moving targets which are within the sea clutter range may be seen on an A scope, but if the AMTI threshold is optimized for clutter residue (threshold A in FIG. 3) then the noise region becomes saturated. Expressed differently, many "false alarms" occur in this noise region due to the difficulty in recognizing a target signal against a noise background. Conversely, if the threshold is optimized for the noise region (threshold B in FIG. 3) small moving targets in the clutter are lost. At the present time, therefore, detection of moving targets in the clutter region by a radar system of this nature is not completely satisfactory.

A number of attempts have previously been made to overcome the above drawback, a majority of these attempts having been directed to measuring the video signal and then making a correction thereto or to the threshold level. However, these expedients introduced undesirable time shifts which were unacceptable and seriously degraded the radar output.

In accordance with a feature of the present invention the above problem is solved by the provision of a circuit which acts to delay the video signal to be regulated by a time period exactly equal to the interval required to measure the video signal and develop a "smooth" regulating voltage. A time-coincident regulation is thus achieved, and the fidelity of the video output unimpaired. Although the actual circuitry which constitutes a preferred embodiment of the present invention will be described in detail hereinafter, it might be stated at this point that the necessary regulation is achieved by passing the 5-megacycle (for example) radar video through a low-pass filter having a cut-off at approximately 80 kilocycles. This filter eliminates the high-frequency components in the video signal and reduces the waveform thereof essentially to its own envelope. The total time delay incurred in this operation is approximately 5-microseconds. FIG. 4 of the drawings indicates the resulting waveform. This wave is then inverted in phase, as shown in FIG. 5.

In addition to the above, 5-megacycle radar video is also delayed 5 microseconds in a wide-band delay line. The two delayed waves of FIGS. 3 and 5 are then combined to result in a signal such as shown in FIG. 6 of the drawings. It will be noted that the peaks of the thermal noise power have been made to match the peaks of the clutter residue. Consequently, uniform signal peaks are provided to the input of the threshold device, and a new threshold C may be established. Inasmuch as narrow pulses from the desired moving targets are not passed by the low-pass filter, the moving target signals remain above the back ground of clutter residue and noise.

Although a 5-microsecond time delay is introduced into the output of the radar by the presence of applicant's auxiliary equipment, the resulting .4 mile range error is readily taken into account in determining target location.

The apparatus for accomplishing the results above described takes the form of a video processor, identified by the reference numeral 10 in the block diagram of FIG. 7. This processor 10 is connected between an airborne AMTI radar 12 and a computer-detector 14, the latter including some suitable memory or storage device (such as a magnetic drum) on which data collected during several successive radar sweeps may be retained and compared in order to separate out signals representing moving targets. Applicant's invention, however is not concerned with the operating details of these assemblies 12 and 14, and hence these units are shown only schematically in the drawings. If desired, a computer-indicator 16 (including a display device) may be employed in parallel with the computer-detector 14 in order to provide a visual presentation for immediate observation on the radar carrying aircraft.

A schematic circuit diagram of the video processor 10 of FIG. 7 is set forth in FIG. 8. It is designed to operate on a 28-volt D-C supply, such as might be available on the aircraft on which the AMTI radar 12 is carried. In order to filter out any noise which might be present in such power supply, capacitors 18 and 20 and a resistor 22 are utilized, while a crystal 24 (a Zener diode) and a transistor 26 regulate the potential at a 7.5 volt level at point 28.

The video signal from the radar 12 of FIG. 7 is present at the input terminal 30 of the processor of FIG. 8. This signal is applied to a pair of emitter followers 32 and 34. Emitter follower 34 drives a 64 kc. low-pass inductance-capacitance filter 36–38 which is terminated by the resistor network 40, 42, 44 to prevent reflection of energy back toward transistor 34.

At this point the high-frequency components have been eliminated, and the waveform is the slowly-changing voltage of FIG. 4. In order to invert this envelope to produce the wave of FIG. 5, transistor 46 is utilized, this component acting as an inverter amplifier which is biased to conduct heavily so as to pass the negative signals from the low-pass filter 36–38. A potentiometer 48 permits gain adjustment in the low-pass circuit so that the amplitude of the inverted envelope of FIG. 5 may be controlled.

As hereinbefore stated, the "smoothed" inverted envelope of FIG. 5, consisting of the signal derived from potentiometer 48, is added to the original video signal appearing at terminal 30. The potentiometer 48 thus constitutes a balance control which allows the radar operation to adjust the relative levels of AMTI clutter residue and thermal noise so as to permit the establishment of the single threshold level C of FIG. 6 of the drawings.

To accomplish this objective, the emitter follower 32 of FIG. 8 drives a conventional 5-microsecond delay line 50 which is terminated in its characteristic impedance by resistor 52. Emitter follower 54 consequently provides wide-band video to the adder network 56–58, the smoothed and inverted signal of FIG. 5 being supplied over conductor 60 from the output circuit of transistor 62.

The emitter-follower 64 applies the output of the adder network 56–58 to two stages of amplification incorporating the transistors 66–68 this being necessary to bring the amplitude of the signal back to its original level.

A further emitter-follower 70 drives two output transistors 72 and 74 so as to provide separate signals to the computer indicator 16 of FIG. 7 as well as to the computer detector 14 in case the latter is utilized.

Obviously many modifications and variations of the present invention are possible in the light of the above teachings. It is therefore to be understood that within the scope of the appended claims the invention may be practiced otherwise than as specifically described.

I claim:

1. In an airborne radar of the moving-target-indicator type designed especially for ocean surveillance, in which radar a generated pulse is expanded for transmission and then the received pulse compressed to its original length, such radar including a coherent canceller for reducing received signals representing sea clutter to a peak level below that of the signals representing thermal noise, such radar also including means for establishing a threshold level above which moving targets alone are desired to appear, the improvement which comprises:

a circuit for amplitude-matching the peaks of the sea clutter residue to the peaks of the thermal noise; and means for establishing a uniform threshold essentially coinciding with the common amplitude level produced by said matching circuit representing the peaks of the sea clutter residue and the peaks of the thermal noise, whereby all indications indicative of moving targets both in the sea clutter region and in the thermal noise region appear above the uniform threshold thus produced by said matching circuit and are thereby rendered more readily capable of being detected by said radar;

said circuit for amplitude matching the peaks of the sea clutter residue to the peaks of the thermal noise including:

(a) means for eliminating from a first portion of the processed signal all components having a frequency above a predetermined cut-off value;

(b) means for introducing a time-delay into a second portion of the processed signal, such time delay being equal in amount to the time delay incurred by said first signal portion in having the high-frequency components eliminated therefrom;

(c) means for inverting the phase of the said first signal portion after the high-frequency components have been removed therefrom; and (d) means for adding the signal output of the phase-inverting means with the signal output of the time-delay introducing means so as to re-combine the two said signal portions.

2. The combination of claim 1, in which the means for eliminating from a first portion of the processed signal all components having a frequency above a predetermined cut-off value comprises a low-pass filter which acts to reduce the said first signal portion essentially to its own envelope.

References Cited

UNITED STATES PATENTS

| 3,121,224 | 2/1964 | Bachmann | 343—7.7 |
| 3,176,293 | 3/1965 | Nolen et al. | 343—17.1 XR |
| 3,209,354 | 9/1965 | Stull | 343—7.7 |
| 3,214,754 | 10/1965 | Hildebrandt | 343—17.1 XR |

RICHARD A. FARLEY, Primary Examiner

J. P. MORRIS, Assistant Examiner